United States Patent
Robere et al.

(10) Patent No.: US 12,227,111 B2
(45) Date of Patent: Feb. 18, 2025

(54) VEHICLE LOAD ADAPTIVE REGENERATIVE BRAKING

(71) Applicant: GM GLOBAL TECHNOLOGY OPERATIONS LLC, Detroit, MI (US)

(72) Inventors: Matthew Allen Robere, Novi, MI (US); Eric E Krueger, Chelsea, MI (US); Arthur D Drennen, Commerce Township, MI (US); Michael F O'Leary, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 312 days.

(21) Appl. No.: 17/810,515

(22) Filed: Jul. 1, 2022

(65) Prior Publication Data

US 2024/0001770 A1 Jan. 4, 2024

(51) Int. Cl.
*G05D 1/00* (2024.01)
*B60L 7/26* (2006.01)
*B60L 15/20* (2006.01)

(52) U.S. Cl.
CPC ............ *B60L 7/26* (2013.01); *B60L 15/2009* (2013.01); *B60L 2240/423* (2013.01); *B60L 2240/463* (2013.01)

(58) Field of Classification Search
CPC ........................................................ B60L 7/26
See application file for complete search history.

(56) References Cited

U.S. PATENT DOCUMENTS

| | | | |
|---|---|---|---|
| 2020/0189398 A1* | 6/2020 | Suzuki | B60T 8/1766 |
| 2020/0238929 A1* | 7/2020 | Wippler | B60W 50/14 |
| 2021/0237583 A1* | 8/2021 | Huang | F16D 61/00 |
| 2022/0153272 A1* | 5/2022 | Tokura | B60W 10/08 |
| 2022/0194232 A1* | 6/2022 | Lu | B60L 7/18 |

* cited by examiner

*Primary Examiner* — Redhwan K Mawari
*Assistant Examiner* — Paul W Arellano
(74) *Attorney, Agent, or Firm* — Lorenz & Kopf LLP (57) ABSTRACT

In accordance with exemplary embodiments, methods and systems are provided for controlling regenerative braking of a vehicle is provided that include: obtaining, via one or more sensors of the vehicle, sensor data pertaining to a load on the vehicle during a particular vehicle drive; determining, via a processor of the vehicle, a maximum regenerative braking torque for the vehicle for the particular vehicle drive based on the load on the vehicle; and controlling the regenerative braking of the vehicle during the particular vehicle drive, via instructions provided by the processor, based on the maximum regenerative braking torque for the vehicle for the particular vehicle drive.

13 Claims, 4 Drawing Sheets

VEHICLE LOAD ADAPTIVE REGENERATIVE BRAKING

TECHNICAL FIELD

The technical field generally relates to vehicles and, more specifically, to methods and systems for controlling regenerative braking in vehicles.

BACKGROUND

Certain vehicles today have regenerative braking capabilities, in which some energy from the vehicle is recaptured via braking and utilized to charge a battery of the vehicle. However, control of regenerative braking in vehicles may not always be optimal, for example, in balancing optimal regenerative braking versus the possibility of vehicle instability.

Accordingly, it is desirable to provide improved methods and systems for controlling regenerative braking, including to optimize regenerative braking torque while maintaining vehicle stability. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling regenerative braking of a vehicle is provided that includes: obtaining, via one or more sensors of the vehicle, sensor data pertaining to a load on the vehicle during a particular vehicle drive; determining, via a processor of the vehicle, a maximum regenerative braking torque for the vehicle for the particular vehicle drive based on the load on the vehicle; and controlling the regenerative braking of the vehicle during the particular vehicle drive, via instructions provided by the processor, based on the maximum regenerative braking torque for the vehicle for the particular vehicle drive in combination with a driver braking intent or a braking intent of an autonomous braking system.

Also in an exemplary embodiment, the method further includes obtaining, via one or more additional sensors of the vehicle, additional sensor data pertaining to a velocity of the vehicle; wherein the step of determining the maximum braking torque comprises determining the maximum braking torque based on the velocity in addition to the load.

Also in an exemplary embodiment, the step of controlling the regenerative braking includes: providing regenerative braking torque in a calculated amount based on the driver braking intent or the braking intent of an autonomous braking system, subject to the maximum regenerative braking torque for the vehicle for the particular vehicle drive, via the instructions provided by the processor; and providing any additional required braking torque via friction braking, via the instructions provided by the processor.

Also in an exemplary embodiment, the maximum regenerative braking torque is determined separately by the processor for each particular vehicle drive, in a manner such that the maximum regenerative braking torque for each particular vehicle drive is positively correlated with the load on the vehicle for the particular vehicle drive.

Also in an exemplary embodiment: the step of obtaining the sensor data includes obtaining, via one or more axle sensors of the vehicle, axle sensor data pertaining to the load on a particular axle of the vehicle during the particular vehicle drive; the step of determining the maximum regenerative braking torque includes determining, via the processor of the vehicle, the maximum regenerative braking torque for the particular axle for the particular vehicle drive based on the load on the particular axle; and the step of controlling the regenerative braking includes controlling an amount of regenerative braking torque applied to the particular axle, in accordance with the instructions provided by the processor, based on the maximum regenerative braking torque for the particular axle for the particular vehicle drive.

Also in an exemplary embodiment: the step of obtaining the sensor data includes: obtaining, via one or more front axle sensors of the vehicle, front axle sensor data pertaining to the load on a front axle of the vehicle during the particular vehicle drive; and obtaining, via one or more rear axle sensors of the vehicle, rear axle sensor data pertaining to the load on a rear axle of the vehicle during the particular vehicle drive; the step of determining the maximum regenerative braking torque includes determining, via the processor of the vehicle: a front axle maximum regenerative braking torque for the front axle for the particular vehicle drive based on the load on the front axle; and a rear axle maximum regenerative braking torque for the rear axle for the particular vehicle drive based on the load on the rear axle; and the step of controlling the regenerative braking includes controlling, in accordance with the instructions provided by the processor: a first amount of the regenerative braking torque applied to the front axle, based on the front axle maximum regenerative braking torque for the front axle for the particular vehicle drive; and a second amount of the regenerative braking torque applied to the rear axle, based on the rear axle maximum regenerative braking torque for the rear axle for the particular vehicle drive.

Also in an exemplary embodiment, the method further includes determining the load, via the processor, based on one or more other parameters of the sensor data.

In another exemplary embodiment, a system is provided for controlling regenerative braking of a vehicle, the system including: one or more sensors configured to obtain sensor data pertaining to a load on the vehicle during a particular vehicle drive; and a processor that is coupled to the one or more sensors and that is configured to at least facilitate: determining a maximum regenerative braking torque for the vehicle for the particular vehicle drive based on the load on the vehicle; and controlling the regenerative braking of the vehicle during the particular vehicle drive, via instructions provided by the processor, based on the maximum regenerative braking torque for the vehicle for the particular vehicle drive in combination with a driver braking intent or a braking intent of an autonomous braking system.

Also in an exemplary embodiment, the system further includes one or more additional sensors of the vehicle that are configured to obtain additional sensor data pertaining to a velocity of the vehicle; wherein the processor is further configured to at least facilitate determining the maximum braking torque based on the velocity of the vehicle in addition to the load.

Also in an exemplary embodiment, the processor is further configured to at least facilitate: providing regenerative braking torque in a calculated amount based on the driver braking intent or the braking intent of an autonomous braking system, subject to the maximum regenerative braking torque for the vehicle for the particular vehicle drive, via the instructions provided by the processor; and providing any additional required braking torque via friction braking, via the instructions provided by the processor.

Also in an exemplary embodiment, the processor is further configured to at least facilitate determining the maximum regenerative braking torque separately for each particular vehicle drive, in a manner such that the maximum regenerative braking torque for each particular vehicle drive is positively correlated with the load on the vehicle for the particular vehicle drive.

Also in an exemplary embodiment: the one or more sensors include one or more axle sensors of the vehicle that are configured to obtain axle sensor data pertaining to the load on a particular axle of the vehicle during the particular vehicle drive; and the processor is further configured to at least facilitate: determining the maximum regenerative braking torque for the particular axle for the particular vehicle drive based on the load on the particular axle; and controlling an amount of regenerative braking torque applied to the particular axle, in accordance with the instructions provided by the processor, based on the maximum regenerative braking torque for the particular axle for the particular vehicle drive.

Also in an exemplary embodiment, the one or more sensors include: one or more front axle sensors of the vehicle that are configured to obtain front axle sensor data pertaining to the load on a front axle of the vehicle during the particular vehicle drive; and one or more rear axle sensors of the vehicle that are configured to obtain rear axle sensor data pertaining to the load on a rear axle of the vehicle during the particular vehicle drive; and the processor is further configured to at least facilitate: determining a front axle maximum regenerative braking torque for the front axle for the particular vehicle drive based on the load on the front axle; determining a rear axle maximum regenerative braking torque for the rear axle for the particular vehicle drive based on the load on the rear axle; and controlling, in accordance with the instructions provided by the processor: a first amount of the regenerative braking torque applied to the front axle, based on the front axle maximum regenerative braking torque for the front axle for the particular vehicle drive; and a second amount of the regenerative braking torque applied to the rear axle, based on the rear axle maximum regenerative braking torque for the rear axle for the particular vehicle drive.

Also in an exemplary embodiment, the processor is further configured to at least facilitate determining the load based on one or more other parameters of the sensor data.

In another exemplary embodiment, a vehicle is provided that includes: a body, a propulsion system; one or more sensors; and a processor. The propulsion system is configured to generate movement of the body. The one or more sensors are configured to obtain sensor data pertaining to a load on the vehicle during a particular vehicle drive. The processor is coupled to the one or more sensors, and is configured to at least facilitate: determining a maximum regenerative braking torque for the vehicle for the particular vehicle drive based on the load on the vehicle; and controlling the regenerative braking of the vehicle during the particular vehicle drive, via instructions provided by the processor, based on the maximum regenerative braking torque for the vehicle for the particular vehicle drive in combination with a driver braking intent or a braking intent of an autonomous braking system.

Also in an exemplary embodiment, the vehicle further includes one or more additional sensors of the vehicle that are configured to obtain additional sensor data pertaining to a velocity of the vehicle; wherein the processor is further configured to at least facilitate determining the maximum braking torque based on the velocity of the vehicle in addition to the load.

Also in an exemplary embodiment, the processor is further configured to at least facilitate: providing regenerative braking torque in a calculated amount based on the driver braking intent or the braking intent of an autonomous braking system, subject to the maximum regenerative braking torque for the vehicle for the particular vehicle drive, via the instructions provided by the processor; and providing any additional required braking torque via friction braking, via the instructions provided by the processor.

Also in an exemplary embodiment, the processor is further configured to at least facilitate determining the maximum regenerative braking torque separately for each particular vehicle drive, in a manner such that the maximum regenerative braking torque for each particular vehicle drive is positively correlated with the load on the vehicle for the particular vehicle drive.

Also in an exemplary embodiment: the one or more sensors include one or more axle sensors of the vehicle that are configured to obtain axle sensor data pertaining to the load on a particular axle of the vehicle during the particular vehicle drive; and the processor is further configured to at least facilitate: determining the maximum regenerative braking torque for the particular axle for the particular vehicle drive based on the load on the particular axle; and controlling an amount of regenerative braking torque applied to the particular axle, in accordance with the instructions provided by the processor, based on the maximum regenerative braking torque for the particular axle for the particular vehicle drive.

Also in an exemplary embodiment, the one or more sensors include: one or more front axle sensors of the vehicle that are configured to obtain front axle sensor data pertaining to the load on a front axle of the vehicle during the particular vehicle drive; and one or more rear axle sensors of the vehicle that are configured to obtain rear axle sensor data pertaining to the load on a rear axle of the vehicle during the particular vehicle drive; and the processor is further configured to at least facilitate: determining a front axle maximum regenerative braking torque for the front axle for the particular vehicle drive based on the load on the front axle; determining a rear axle maximum regenerative braking torque for the rear axle for the particular vehicle drive based on the load on the rear axle; and controlling, in accordance with the instructions provided by the processor: a first amount of the regenerative braking torque applied to the front axle, based on the front axle maximum regenerative braking torque for the front axle for the particular vehicle drive; and a second amount of the regenerative braking torque applied to the rear axle, based on the rear axle maximum regenerative braking torque for the rear axle for the particular vehicle drive.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
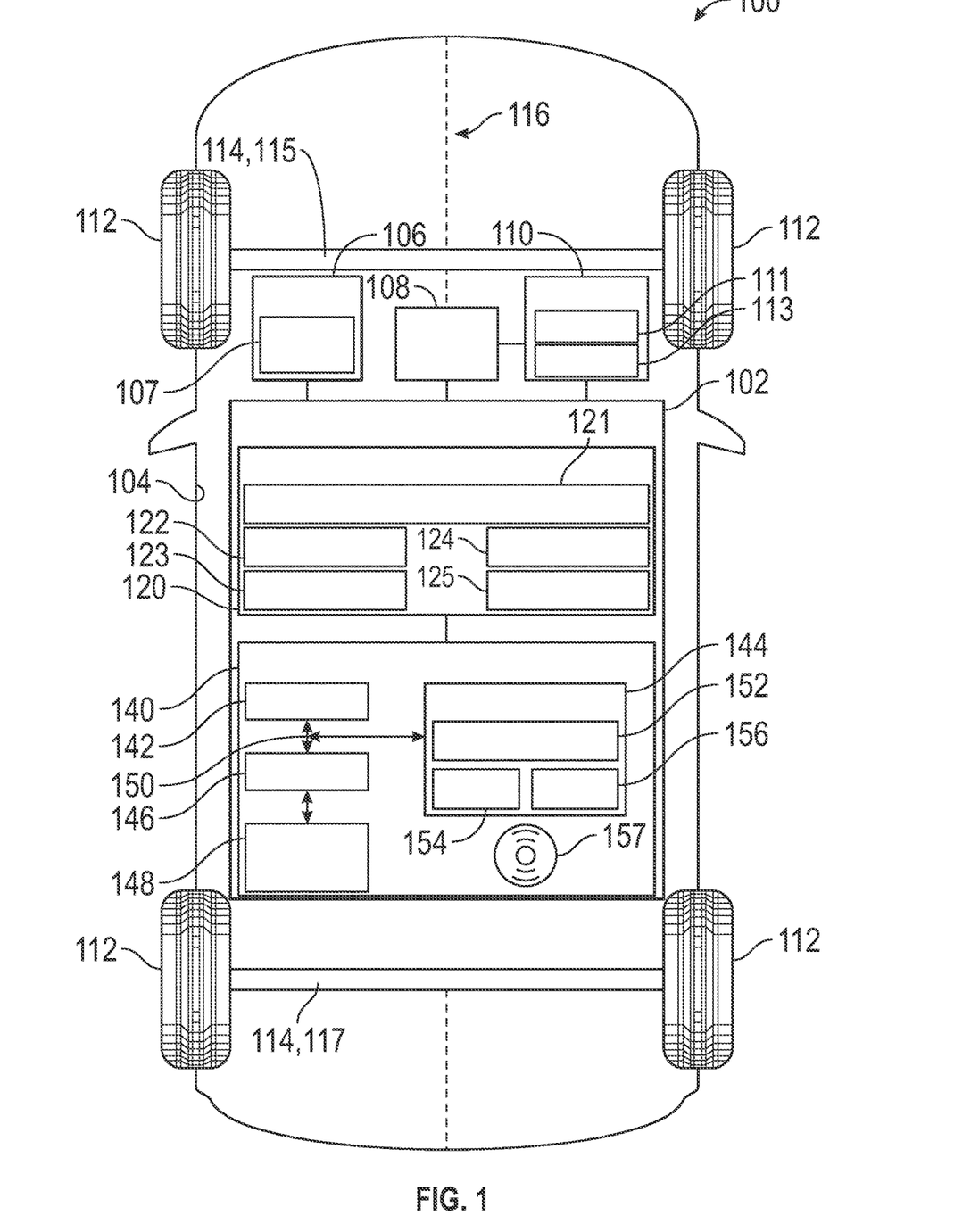
FIG. 1 is a functional block diagram of a vehicle having regenerative braking capabilities and a control system for controlling regenerative braking based on loads on the vehicle axles, in accordance with exemplary embodiments.

FIG. 1 illustrates a vehicle 100. In various embodiments, and as described below, the vehicle 100 includes a control system 102 for controlling various functions of the vehicle 100, including control of regenerative braking of the vehicle 100 based on loads of one or more axles 114 of the vehicle 100, in accordance with exemplary embodiments. As depicted in FIG. 1, the vehicle 100 has two axles 114, including a front axle 115 and a rear axle 117. It will be appreciated that in different embodiments the vehicle 100 may include a different number of axles 114.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112 and axles 114 coupled thereto. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112 via the axles 114. In the depicted embodiment, the drive system comprises a propulsion system that includes one or more engines 111 and/or motors 113. In one embodiment, the drive system 110 includes an internal combustion propulsion engine 111 and an electric motor/generator 113, coupled with a transmission thereof. However, it will be appreciated that this may vary in other embodiments. For example, in certain embodiments, an electric motor/generator 113 may be utilized, without an additional engine 111, and so on. In various embodiments, the vehicle 100 may incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

Also as depicted in FIG. 1, the vehicle 100 also includes a rechargeable energy storage system (RESS) 108. In various embodiment, the RESS 108 (e.g., comprising one or more vehicle batteries) provide power for the drive system 110, for example for the one or more engines 111 and/or motors 113 thereof.

In addition, as depicted in FIG. 1, the vehicle 100 also includes a braking system 106. In various embodiments, the braking system 106 includes a brake pedal 107 for a driver of the vehicle 100 to provide inputs for controlling braking via the braking system 106. In various embodiments, the braking system 106 includes regenerative braking functionality (e.g., in which the motor 113 is run in a reverse mode to charge the RESS 108) as well as non-regenerative braking functionality (e.g., in which friction brakes alone are utilized, without charging the RESS 108). In certain embodiments, the driver may control braking at least in part by providing driver braking inputs via the brake pedal 107, or via one or more other devices, such as an accelerator pedal (e.g., in certain embodiments, such as "one pedal driving", in which release of a pedal such as an accelerator pedal may result in driver requested deceleration and/or braking, and so on). Also in certain embodiments, braking intent may also be obtained from one or more autonomous functions and/or systems for the vehicle, such as autonomous driving, semi-autonomous driving, adaptive cruise control, and so on.

In the embodiment depicted in FIG. 1, the control system 102 is coupled to the braking system 106 and the drive system 110. In certain embodiments, as depicted in FIG. 1, the control system 102 may also be coupled to the RESS 108 (e.g., either directly coupled to the RESS 108 and/or indirectly coupled to the RESS 108 via the drive system 110). Also as depicted in FIG. 1, in various embodiments, the control system 102 includes a sensor array 120 and a controller 140.

In various embodiments, the sensor array 120 includes various sensors that obtain sensor data for obtaining information for control of braking for the vehicle, including regenerative braking, among various other vehicle functions. In the depicted embodiment, the sensor array 120 includes one or more input sensors 121, front axle sensors 122, rear axle sensors 123, other load sensors 124, and velocity sensors 125. It will be appreciated that in certain embodiments the sensor array 120 may also contain any number of other sensors.

In various embodiments, the input sensors 121 obtain inputs from a driver of the vehicle 100. In various embodiments, the input sensors 121 comprise one or more brake pedal sensors that are coupled to the brake pedal 107 of the braking system 106. For example, in certain embodiments, the input sensors 121 comprise one or more brake pedal travel sensors and/or brake pedal force sensors for detecting a driver's engagement of the brake pedal.

Also in various embodiments, the front axle sensors 122 measure a load on a front axle 115 of the vehicle 100. In certain embodiments, the front axle sensors 122 measure a mass and/or weight of the load on the front axle 115. In certain embodiments, the front axle sensors 122 are integrated with and/or are attached to and/or otherwise coupled to the front axle 115.

In addition, in various embodiments, the rear axle sensors 123 measure a load on a rear axle 117 of the vehicle 100. In certain embodiments, the rear axle sensors 123 measure a mass and/or weight of the load on the rear axle 117. In certain embodiments, the rear axle sensors 123 are integrated with and/or are attached to and/or otherwise coupled to the rear axle 117.

Also in various embodiments, the other load sensors 124 comprise one or more sensors that are configured to obtain sensor data that may be used in estimating a load on one or more axles 114 of the vehicle 100. For example, in certain embodiments, the other load sensors 124 may comprise one or more scales and/or other sensors that are configured to measure and/or detect a total mass and/or total weight and/or center of gravity of the vehicle 100, among other possible sensors.

Also in various embodiments, the velocity sensors 125 comprise one or more sensors that are configured to measure and/or detect a velocity of the vehicle 100, and/or other sensor data that may be used to calculate a velocity of the vehicle 100. In certain embodiments, the velocity sensors 125 comprise one or more wheel speed sensors that are coupled to one or more wheels 112 of the vehicle 100. In certain other embodiments, the velocity sensors 125 may comprise, by way of other examples, one or more other speed sensors for the vehicle 100, one or more accelerometers of the vehicle 100, and so on.

In certain embodiments, the sensor array 120 may also include one or more additional types of sensors, such as by way of example one or more torque sensors, among other different possible types of sensors.

In various embodiments, the controller 140 is coupled to the sensor array 120. In various embodiments, the controller 140 may also be coupled to the braking system 106, RESS 108, and/or the drive system 110 (e.g., including the engine 111 and/or the motor 113 thereof). Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls braking (including regenerative braking) for the vehicle 100 based on the loads on the different axles 115, 117, among various other vehicle functions. In various embodiments, the controller 140 controls various other functions of the vehicle 100, including movement thereof, for example as part of an engine control unit (ECU) of the vehicle 100. In various embodiments, the controller 140 provides these and other functions in accordance with the steps of the process 200 of FIG. 2 and implementations of FIGS. 3-4 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and implementations of FIGS. 3-4 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 156 (e.g., threshold values for controlling regenerative braking).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the process 200 of FIG. 2 and implementations of FIGS. 3-4 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
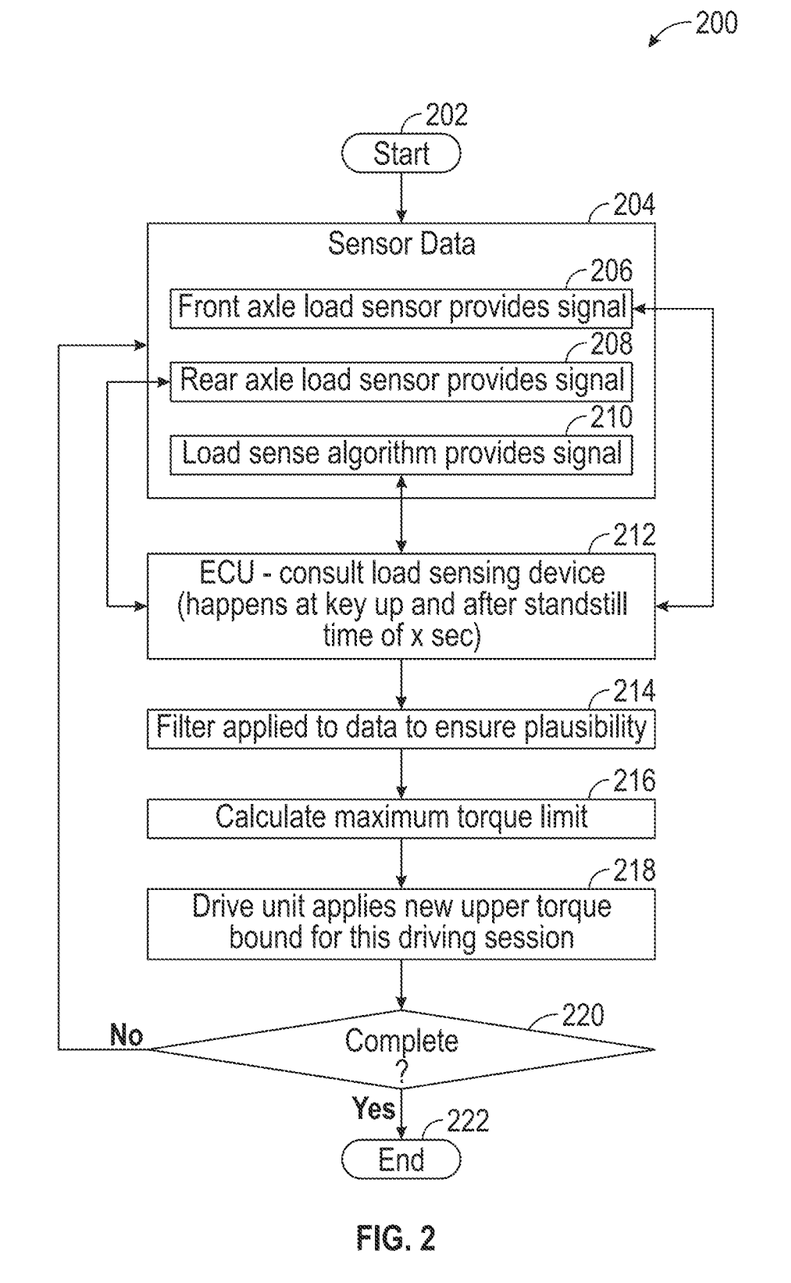
FIG. 2 is a flowchart of a process for controlling regenerative braking based on loads on the vehicle axles, and that can be implemented in connection with the vehicle of FIG. 1, including the control system thereof, in accordance with exemplary embodiments.

With reference to FIG. 2, a flowchart is provided of a process 200 for controlling regenerative braking based on loads on the vehicle axles, in accordance with exemplary embodiments. In various embodiments, the process 200 can be implemented in connection with the vehicle 100 of FIG. 1, including the control system 102 thereof. The process 200 is described below in connection with FIG. 2 as well as FIGS. 3 and 4 (which depict exemplary implementations of the process 200).

As depicted in FIG. 2, the process 200 begins at step 202. In one embodiment, the process 200 begins when a vehicle drive or ignition cycle begins, for example when a driver or other user approaches or enters the vehicle 100, when the driver or other user turns on the vehicle and/or an ignition therefor (e.g. by turning a key, engaging a keyfob or start button, and so on), or when the vehicle begins operation (e.g., by a driver action for a driver-controlled vehicle or via the control system 102 in the case of autonomous vehicle). In one embodiment, the steps of the process 200 are performed continuously during operation of the vehicle.

In various embodiments, sensor data is obtained (step 204). In various embodiments, sensor data is obtained with respect to loads on the axles of the vehicle 100.

In various embodiments, step 204 (obtaining sensor data) can be considered as comprising multiple steps (or sub-steps) 206-210, among other possible steps, as described below.

For example, in various embodiments, front axle load data is obtained at step 206. In various embodiments, a mass (or weight) of the load on the front axle 115 of FIG. 1 is measured and/or obtained via the front axle sensors 122 of FIG. 1. In certain embodiments, a mass (or weight) of the load on the front axle 115 is provided via the front axle sensors 122 of FIG. 1 via signals provided thereby to the processor 142 of FIG. 1.

Also in various embodiments, rear axle load data is obtained at step 208. In various embodiments, a mass (or weight) of the load on the rear axle 117 of FIG. 1 is measured and/or obtained via the rear axle sensors 123 of FIG. 1. In certain embodiments, a mass (or weight) of the load on the rear axle 117 is provided via the rear axle sensors 123 of FIG. 1 via signals provided thereby to the processor 142 of FIG. 1.

In addition, in various embodiments, other sensor data is obtained at step 210. In various embodiments, a mass (or weight) of the load on the rear axle 117 of FIG. 1 is estimated based on a total mass (or weight) of the vehicle, a center of gravity of the vehicle, and/or other sensor data obtained via the other load sensors 124 of FIG. 1. In certain embodiments, this sensor data is provided via the other load sensors 124 of FIG. 1 via signals provided thereby to the processor 142 of FIG. 1, for example for use in estimating the load on one or both of the first and/or rear axles 115, 117 utilizing a load estimation algorithm using these values and/or other parameter values.

In addition, in various embodiments, sensor data is also obtained with respect to a braking intent for the vehicle, such as from a driver and/or autonomous system for the vehicle. For example, in certain embodiments, sensor data as to a driver braking intent may be obtained via sensors coupled to a brake pedal, accelerator pedal, and/or propulsion system of the vehicle. By way additional example, braking intent may also be ascertained with respect to one or more autonomous driving systems of the vehicle, such as one or more systems for autonomous driving, semi-autonomous driving, adaptive cruise control, and so on. Also in certain embodiments, the other sensor data may also include velocity data from the velocity sensors 125 of FIG. 1, and in certain embodiments may also include one or more other types of sensor values (e.g., torque values, and so on).

In various embodiments, the sensor data is obtained during steps 204-210 throughout the duration of the current vehicle drive cycle, and preferably continuously throughout the duration of the current vehicle drive cycle.

In various embodiments, the sensor data is received by the processor (step 212). In various embodiments, the processor 142 of FIG. 1 (e.g., of an engine control unit of the vehicle 100) obtains the sensor data of steps 204-210. In certain embodiments, the processor 142 receives the sensor data by sending an inquiry to or otherwise consulting with the sensor array 120 of FIG. 1 and/or one or more load sensing devices pertaining thereto. In certain embodiments, such inquiry or consultation occurs at vehicle start-up (e.g., at key-up) and after a standstill of the vehicle for a predetermined amount of time (e.g., a predetermined amount of seconds, in certain embodiments). In certain other embodiments, such inquiry or consultation may occur continuously throughout the process 200.

In certain embodiments, filtering is performed for the sensor data (step 214). In various embodiments, the processor 142 of FIG. 1 applies one or more filtering techniques to the sensor data of steps 204-212 to ensure plausibility of the sensor data values. In certain embodiments.

In various embodiments, one or more maximum torque limits for regenerative braking are calculated (step 216). In various embodiments, a processor (such as the processor 142 of FIG. 1) calculates the maximum torque limit(s) based on the sensor data of steps 204-212, and as filtered during step 214. In various embodiments, the maximum torque limit(s) are based on the loads that are measured and/or calculated for the axles 114 of FIG. 1. Specifically, in various embodiments, the maximum torque limit is a function of the axle load(s) with a positive correlation, such that: (i) the maximum torque limit increases as the axle load(s) increase; and (ii) the maximum torque limit decreases as the axle load(s) decrease. In various embodiments, the maximum torque limit is also based on the vehicle velocity.

In various embodiments, the maximum torque limit is raised (when axle load increases) and lowered (when axle load decreases) in this manner in order to optimize regenerative braking torque while helping to maintain vehicle stability. Specifically, in certain embodiments, this is based on a physics-based model that the vehicle can provide additional regenerative braking torque while maintaining vehicle stability when relatively higher loads are present on the axle(s), as compared with other situations in which relatively lower loads are present on the axle(s).

In various embodiments, the maximum torque limit for regenerative braking may be raised and lowered in this matter separately for each axle 114 of the vehicle 100. For example, in certain embodiments, the maximum torque limit for regenerative braking for the front axle 115 and rear axle 117 may be determined separately for each axle 115, 117, based on the different individual loads on the front axle 115 and the rear axle 117, respectively. In certain other embodiments, the maximum torque limit for the different axles 115, 117 may be raised and/or lowered independently based on the load on the front axle 115 alone and the load on the rear axle 117, respectively. However, this may vary in other embodiments. In certain embodiments, the maximum torque limit for regenerative braking may be determined for the axles individually and/or collectively based on one or more of the axle loads, taken individually or collectively, or some other combination thereof (e.g., in certain embodiments, the maximum torque limit may be based on the higher of the two loads on the axles 115, 117, or based on the lower of the two loads on the axles 115, 117, or based on an average of the loads on the axles 115, 117, and so on), among other possible variations in different embodiments.

As noted above, in certain embodiments, the maximum regenerative braking torque for each axle 115, 117 may be calculated separately, based on the separate loads determined for each of the respective axles 115, 117. For example, in certain embodiments: (i) a front axle maximum regenerative braking torque for the front axle for the particular vehicle drive is determined based on a front axle load that is determined or measured based on front axle sensor data pertaining to a load on a front axle of the vehicle during a particular vehicle drive; and (ii) a rear axle maximum regenerative braking torque for the rear axle for the particular vehicle drive is determined based on a rear axle load that is determined or measured based on rear axle sensor data pertaining to a load on a rear axle of the vehicle during a particular vehicle drive. However, this may vary in other embodiments.

Also in various embodiments, the maximum regenerative braking torque is determined separately by the processor for each particular vehicle drive, in a manner such that the maximum regenerative braking torque for each particular vehicle drive is positively correlated with the load on the vehicle for the particular vehicle drive. Specifically, in various embodiments: (i) when the load increases for a particular vehicle drive (e.g., ignition cycle), the maximum regenerative braking torque is increased, via the processor 142 of FIG. 1, for the particular vehicle drive; and (ii) when the load decreases for a particular vehicle drive (e.g., ignition cycle), the maximum regenerative braking torque is decreased, via the processor 142 of FIG. 1, for the particular vehicle drive.

In various embodiments, the regenerative torque is applied (step 218). In various embodiments, a processor (such as the processor 142 of FIG. 1) controls braking of the vehicle 100 using the braking system 106 and the motor 113 of FIG. 1, including application of friction and regenerative braking. In various embodiments, the processor 142 provides instructions for regenerative braking torque (e.g., including the running of the motor 113 in reverse for charging the RESS 108 of FIG. 1) based on the driver braking intent (e.g., based on the sensor data with respect to the brake pedal and/or an accelerator pedal and/or propulsion system of the vehicle) and/or a braking intent of an autonomous braking system (e.g. from an autonomous driving system, adaptive cruise control, or the like), subject to the maximum torque limit of step 216. In various embodiments, the regenerative braking torque is provided in a calculated amount based on the driver or autonomous system braking intent, subject to the maximum regenerative braking torque for the vehicle for the particular vehicle drive, and any additional required braking torque is provided via friction braking, via instructions provided by the processor.

In certain embodiments, the regenerative braking torque for each axle of the vehicle is controlled separately based on the respective maximum regenerative braking torque values for the respective different axles. For example, in certain embodiments, the regenerative braking torque is controlled by providing, in accordance to instructions provided by the processor to the braking system of the vehicle: (i) a first amount of the regenerative braking torque applied to the front axle, based on the front maximum regenerative braking torque for the front axle for the particular vehicle drive; and (ii) a second amount of the regenerative braking torque applied to the rear axle, based on the rear maximum regenerative braking torque for the rear axle for the particular vehicle drive. However, this may vary in other embodiments. However, this may vary in other embodiments. For example, in certain embodiments, regenerative braking may be provided in equal amounts across both axles based on one or more of the determined axle loads, among other possible variations in different embodiments.

In various embodiments, the maximum torque limit(s) of step 216 are utilized throughout the remainder of the current drive cycle for the process 200. In various embodiments, the maximum torque limit(s) are dynamically adjusted in step 216 and utilized in step 218 for each drive cycle.

In various embodiments, a determination is made as to whether the current vehicle drive cycle is complete (step 222). In various embodiments, this determination is made throughout the current vehicle drive cycle, for example continuously throughout the current vehicle drive cycle.

In various embodiments, if it is determined during step 222 that the current vehicle drive cycle is not complete, then the process returns to step 204, and steps 204-220 repeat until it is determined in an iteration of step 220 that the current vehicle drive cycle is complete. Also in various embodiments, once it is determined in an iteration of step 220 that the current vehicle drive cycle is complete, the process 200 then terminates at step 222.

Figure 3:
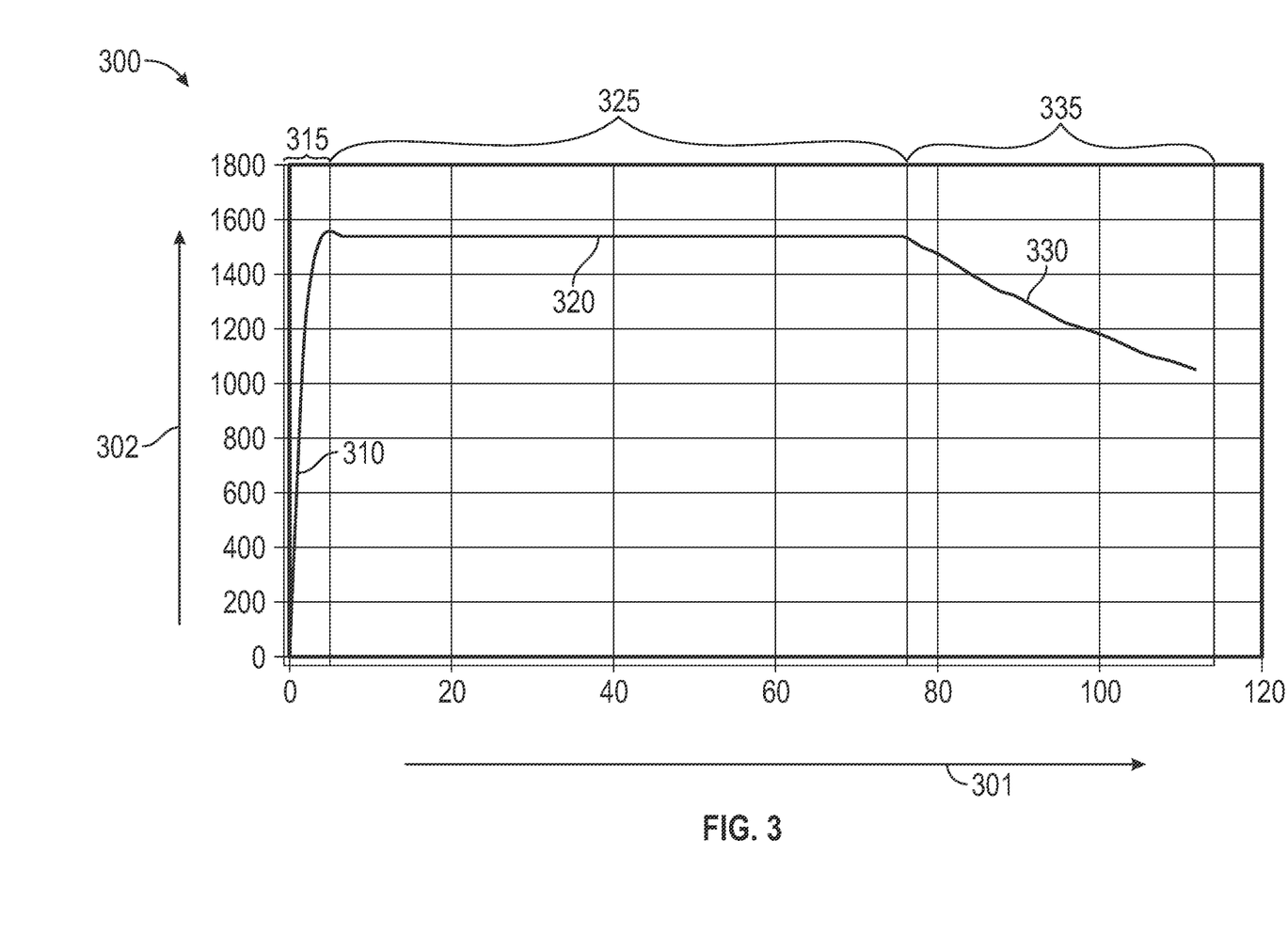
FIGS. 3-4 depict exemplary implementations of the process of FIG. 2, in accordance with exemplary embodiments.
Figure 4:
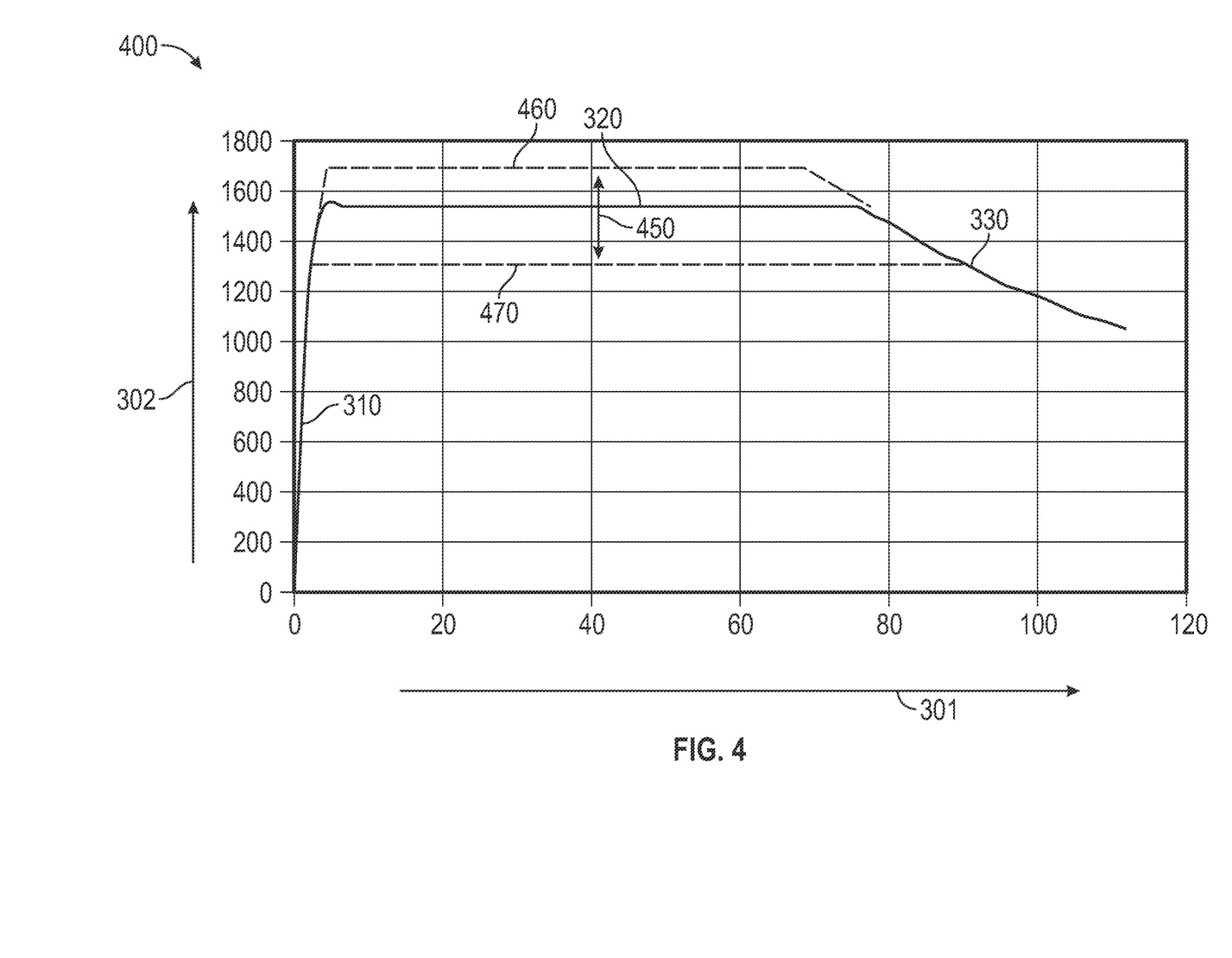

FIGS. 3 and 4 provide exemplary implementations of the process 200, in accordance with exemplary embodiments.

First, as depicted in FIG. 3, a first graphical illustration 300 is provided illustrating the determination of regenerative braking torque calculated as a function of vehicle speed in accordance with a first exemplary embodiment.

As depicted in FIG. 3, the first graphical illustration 300 provides a regenerative braking torque curve based on vehicle velocity. Specifically, the first graphical illustration 300 includes an x-axis 301 featuring vehicle speed in kilometers per hour (kph), and a y-axis 302 featuring regenerative braking torque in Newton-meters (Nm).

As depicted in FIG. 3, the regenerative braking torque includes a range of first values 310 when the vehicle speed is in a first range 315. As shown in FIG. 3, in this first range 315 of relatively small vehicle speeds (e.g., approximately zero to five kilometers per hour in the depicted example), the first values 310 of regenerative braking torque are increasing in magnitude as a function of vehicle speed, with a positive slope and upward trajectory. In various embodiments, this corresponds to an end of the stopping of blending of regenerative braking torque with friction braking torque.

Also as depicted in FIG. 3, the regenerative braking torque also includes a range of second values 320 when the vehicle speed is in a second range 325 that is greater than the vehicle speed values of the first range 315. As shown in FIG. 3, in this second range 325 of mid-level vehicle speeds (e.g., approximately five to seventy-five kilometers per hour in the depicted example), the second values 320 of regenerative braking torque are flat in magnitude, with a zero slope. In various embodiments, this corresponds to the maximum regenerative braking torque for maintaining vehicle stability, such as calculated during the process 200 of FIG. 2.

Also as depicted in FIG. 3, the regenerative braking torque also includes a range of third values 330 when the vehicle speed is in a third range 335 that is greater than the vehicle speed values of both the first range 315 and the second range 325. As shown in FIG. 3, in this third range 335 of relatively higher vehicle speeds (e.g., approximately seventy-five kilometers per hour and above in the depicted example), the third values 330 of regenerative braking torque decrease as a function of vehicle speed, with a negative slope. In various embodiments, this corresponds to the maximum regenerative braking torque being based on the capability and current level of power of the RESS 108 of FIG. 1.

Next, as depicted in FIG. 4, a second graphical illustration 400 is provided illustrating the determination of regenerative braking torque calculated as a function of vehicle speed in accordance with a second exemplary embodiment. As depicted in FIG. 4, the second graphical illustration 400 includes the same x-axis 301 (featuring vehicle speed in kilometers per hour (kph)) and y-axis 302 (featuring regenerative braking torque in Newton-meters (Nm)). The second graphical illustration 400 also depicts the first values 310, second values 320, and third values 330 of regenerative braking torque from FIG. 3.

However, in accordance with a second exemplary embodiment, the second graphical illustration 400 portrays different possible shifts of the second values 320 of the regenerative braking torque, representing different possible shifts of the maximum value of the regenerative braking torque pursuant to step 216 of the process 200 of FIG. 2.

Specifically, in accordance with an exemplary embodiment, if the axle load(s) exceed a predetermined threshold, then a relatively higher maximum value 460 for the regenerative braking torque is utilized for the new second values 460 of the regenerative braking torque, rather than the original second values 320 from FIG. 3. Conversely, also in accordance with an exemplary embodiment, if the axle load(s) is less than the predetermined threshold, then a relatively lower maximum value 470 for the regenerative braking torque is utilized for the new second values 470 of the regenerative braking torque, rather than the original second values 320 from FIG. 3.

Accordingly, as illustrated in FIG. 4, in various embodiments different maximum values 460 or 470 are utilized for the regenerative braking torque based on the calculated maximum value of step 216 of the process 200 of FIG. 2, rather than the original maximum value 320 of FIG. 3. As illustrated in FIG. 4, in an exemplary embodiment, the difference between the different maximum values 460 and 470 may be represented by a difference magnitude 450.

Accordingly, methods, systems, and vehicles are provided for controlling regenerative braking torque for vehicles based on the amount of load on the axles of the vehicle. This provides the potential for optimal regenerative braking while maintaining vehicle stability, using the dynamic adjusting of the maximum regenerative braking torque based on the current load(s) on the axle(s) of the vehicle.

In various embodiments, the techniques described herein may be used in connection with vehicles having a human driver, but that also have automatic functionality (e.g., adaptive cruise control). In various embodiments, the techniques described herein may also be used in connection autonomous vehicles, such as semi-autonomous and/or fully autonomous vehicles.

It will be appreciated that the systems, vehicles, and methods may vary from those depicted in the Figures and described herein. For example, the vehicle 100 of FIG. 1 and/or the components thereof may differ from that depicted in FIG. 1. It will similarly be appreciated that the steps of the process 200 may differ from those depicted in FIG. 2, and/or that various steps of the process 200 may occur concurrently and/or in a different order than that depicted in FIG. 2. It will similarly be appreciated that the various implementation of FIGS. 3 and 4 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling regenerative braking of a vehicle, the method comprising:
obtaining, via one or more front axle sensors of the vehicle, front axle sensor data pertaining to a front axle load on a front axle of the vehicle during a particular vehicle drive;
obtaining, via one or more rear axle sensors of the vehicle, rear axle sensor data pertaining to a rear axle load on a rear axle of the vehicle during the particular vehicle drive;
obtaining, via one or more additional sensors of the vehicle, velocity sensor data pertaining to a velocity of the vehicle during the particular vehicle drive;
determining, via a processor of the vehicle, a maximum front axle regenerative braking torque for the front axle of the vehicle for the particular vehicle drive based on both the front axle load and the velocity of the vehicle;
determining, via the processor, a maximum rear axle regenerative braking torque for the rear axle of the vehicle for the particular vehicle drive based on both the rear axle load and the velocity of the vehicle; and
controlling the regenerative braking of the vehicle during the particular vehicle drive, via instructions provided by the processor, by:
applying regenerative braking torque to the front axle based on the maximum front axle regenerative braking torque; and
applying regenerative braking torque to the rear axle based on the maximum rear axle regenerative braking torque;
wherein the front axle maximum regenerative braking torque and the rear axle maximum regenerative braking torque are determined separately by the processor for each particular vehicle drive based on sensor data obtained both at a start-up of the particular vehicle drive and after a standstill of the vehicle for a predetermined amount of time; and
wherein the maximum front axle regenerative torque and the maximum rear axle regenerative torque are:
positively correlated with the velocity when the velocity is less than a first predetermined threshold;
unaffected by the velocity when the velocity is greater than the first predetermined threshold and less than a second predetermined threshold that is greater than the first predetermined; and negatively correlated with the velocity when the velocity is greater than the second predetermined threshold.

2. The method of claim 1, wherein the step of controlling the regenerative braking comprises:
providing regenerative braking torque in a calculated amount to the front axle and the rear axle based on the driver braking intent or the braking intent of an autonomous braking system, subject to the front axle maximum regenerative braking torque for the front axle for the particular vehicle drive, and further subject to the rear axle maximum regenerative braking torque for the rear axle for the particular vehicle drive, via the instructions provided by the processor; and
providing any additional required braking torque via friction braking, via the instructions provided by the processor.

3. The method of claim 1, wherein the front axle maximum regenerative braking torque and the rear axle maximum regenerative braking torque are determined separately by the processor for each particular vehicle drive, in a manner such that the maximum regenerative braking torque for each particular vehicle drive is positively correlated with the load on the vehicle for the particular vehicle drive.

4. A system for controlling regenerative braking of a vehicle, the system comprising:
one or more front axle sensors configured to obtain front axle sensor data pertaining to a front axle load on a front axle of the vehicle during a particular vehicle drive;
one or more rear axle sensors configured to obtain rear axle sensor data pertaining to a rear axle load on a rear axle of the vehicle during the particular vehicle drive;
one or more additional sensors configured to obtain velocity data as to a velocity of the vehicle during the particular vehicle drive; and
a processor that is coupled to the one or more front axle sensors, rear axle sensors, and additional sensors and that is configured to at least facilitate:
determining a maximum front axle regenerative braking torque for the front axle of the vehicle for the particular vehicle drive based on both the front axle load and the velocity of the vehicle;
determining a maximum rear axle regenerative braking torque for the rear axle of the vehicle for the particular vehicle drive based on both the rear axle load and the velocity of the vehicle; and
controlling the regenerative braking of the vehicle during the particular vehicle drive, via instructions provided by the processor, by:
applying regenerative braking torque to the front axle based on the maximum front axle regenerative braking torque; and
applying regenerative braking torque to the rear axle based on the maximum rear axle regenerative braking torque;
wherein the processor is configured to determine the front axle maximum regenerative braking torque and the rear axle maximum regenerative braking torque separately for each particular vehicle drive based on sensor data obtained both at a start-up of the particular vehicle drive and after a standstill of the vehicle for a predetermined amount of time; and
wherein the maximum front axle regenerative torque and the maximum rear axle regenerative torque are:
positively correlated with the velocity when the velocity is less than a first predetermined threshold;
unaffected by the velocity when the velocity is greater than the first predetermined threshold and less than a second predetermined threshold that is greater than the first predetermined; and
negatively correlated with the velocity when the velocity is greater than the second predetermined threshold.

5. The system of claim 4, wherein the processor is further configured to at least facilitate:
providing regenerative braking torque in a calculated amount to the front axle and the rear axle based on the driver braking intent or the braking intent of an autonomous braking system, subject to the front axle maximum regenerative braking torque for the front axle for the particular vehicle drive, and further subject to the rear axle maximum regenerative braking torque for the rear axle for the particular vehicle drive, via the instructions provided by the processor; and
providing any additional required braking torque via friction braking, via the instructions provided by the processor.

6. The system of claim 4, wherein the processor is further configured to at least facilitate determining the front axle maximum regenerative braking torque and the rear axle maximum regenerative braking torque separately for each particular vehicle drive, in a manner such that the maximum regenerative braking torque for each particular vehicle drive is positively correlated with the load on the vehicle for the particular vehicle drive.

7. A vehicle comprising:
a body;
a propulsion system configured to generate movement of the body;
a braking system configured to control braking for the vehicle;
one or more front axle sensors configured to obtain front axle sensor data pertaining to a front axle load on a front axle of the vehicle during a particular vehicle drive;
one or more rear axle sensors configured to obtain rear axle sensor data pertaining to a rear axle load on a rear axle of the vehicle during the particular vehicle drive;
one or more additional sensors configured to obtain velocity data as to a velocity of the vehicle during the particular vehicle drive; and
a processor that is coupled to the one or more sensors and the braking system and that is configured to at least facilitate:
determining a maximum regenerative braking torque for the vehicle for the particular vehicle drive based on each of the following:
the front axle load;
the rear axle load; and
the velocity of the vehicle; and
controlling the regenerative braking of the vehicle during the particular vehicle drive, via instructions provided by the processor to the braking system, by applying regenerating braking to both the front axle and the rear axle based on the maximum regenerative braking torque for the vehicle for the particular vehicle drive as determined based on the front axle load, the rear axle load, and the velocity of the vehicle;
wherein the processor is configured to determine the front axle maximum regenerative braking torque and the rear axle maximum regenerative braking torque separately for each particular vehicle drive based on sensor data obtained both at a start-up of the particular vehicle drive and after a standstill of the vehicle for a predetermined amount of time; and wherein the maximum front axle regenerative torque and the maximum rear axle regenerative torque are:
- positively correlated with the velocity when the velocity is less than a first predetermined threshold;
- unaffected by the velocity when the velocity is greater than the first predetermined threshold and less than a second predetermined threshold that is greater than the first predetermined; and
- negatively correlated with the velocity when the velocity is greater than the second predetermined threshold.

8. The vehicle of claim 7, wherein the processor is further configured to at least facilitate:
- providing regenerative braking torque in a calculated amount based on the driver braking intent or the braking intent of an autonomous braking system, subject to the maximum regenerative braking torque for the vehicle for the particular vehicle drive, via the instructions provided by the processor; and
- providing any additional required braking torque via friction braking, via the instructions provided by the processor.

9. The vehicle of claim 7, wherein the processor is further configured to at least facilitate determining the maximum regenerative braking torque separately for each particular vehicle drive, in a manner such that the maximum regenerative braking torque for each particular vehicle drive is positively correlated with the load on the vehicle for the particular vehicle drive.

10. The vehicle of claim 7, wherein the processor is further configured to control regenerative braking for both the front axle and the rear axle based on the same maximum braking torque.

11. The vehicle of claim 10, wherein the processor is further configured to determine the maximum braking torque based on an average of the front axle load and the rear axle load, along with the velocity of the vehicle.

12. The vehicle of claim 10, wherein the processor is further configured to determine the maximum braking torque based on a higher of the front axle load and the rear axle load, along with the velocity of the vehicle.

13. The vehicle of claim 10, wherein the processor is further configured to determine the maximum braking torque based on a lower of the front axle load and the rear axle load, along with the velocity of the vehicle.

* * * * *